(12) United States Patent
Wang et al.

(10) Patent No.: US 10,969,566 B2
(45) Date of Patent: Apr. 6, 2021

(54) OPTICAL IMAGING SYSTEM

(71) Applicant: Zhejiang Sunny Optical Co., Ltd, Ningbo (CN)

(72) Inventors: Xinquan Wang, Ningbo (CN); Lin Huang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 253 days.

(21) Appl. No.: 16/274,010

(22) Filed: Feb. 12, 2019

(65) Prior Publication Data

US 2019/0212526 A1 Jul. 11, 2019

Related U.S. Application Data

(63) Continuation of application No. PCT/CN2018/085631, filed on May 4, 2018.

(30) Foreign Application Priority Data

Jan. 5, 2018 (CN) .......................... 201810011340.2
Jan. 5, 2018 (CN) .......................... 201820017804.6

(51) Int. Cl.
*G02B 13/00* (2006.01)
*G02B 27/00* (2006.01)
*G02B 9/34* (2006.01)

(52) U.S. Cl.
CPC ............. *G02B 13/004* (2013.01); *G02B 9/34* (2013.01); *G02B 13/008* (2013.01); *G02B 27/0025* (2013.01)

(58) Field of Classification Search
CPC .... G02B 13/004; G02B 27/0025; G02B 9/34; G02B 13/008
See application file for complete search history.

(56) References Cited

U.S. PATENT DOCUMENTS

| 2010/0097710 | A1 | 4/2010 | Lai et al. |
| 2011/0249171 | A1 | 10/2011 | Shigemitsu |
| 2016/0154216 | A1 | 6/2016 | Liao et al. |
| 2019/0204541 | A1* | 7/2019 | Huang ................. G02B 13/004 |

FOREIGN PATENT DOCUMENTS

| CN | 107219610 | 9/2017 |
| CN | 107315236 | 11/2017 |
| WO | 2011052370 | 5/2011 |

* cited by examiner

*Primary Examiner* — Wen Huang
(74) *Attorney, Agent, or Firm* — Hauptman Ham, LLP

(57) ABSTRACT

The present disclosure discloses an optical imaging system. The optical imaging system includes, sequentially along an optical axis from an object side to an image side: a first lens to a fourth lens. The first lens, the third lens, and the fourth lens each has a positive refractive power or a negative refractive power. The second lens has a positive refractive power, and an image-side surface of the second lens is a concave surface. An image-side surface of the fourth lens is a concave surface. An effective half-diameter DT11 of an object-side surface of the first lens, an effective half-diameter DT21 of an object-side surface of the second lens, an effective half-diameter DT32 of an image-side surface of the third lens, an effective half-diameter DT42 of the image-side surface of the fourth lens and an entrance pupil diameter EPD of the optical imaging system satisfy: (DT11+DT21+DT32+DT42)/EPD≤2.4.

10 Claims, 9 Drawing Sheets

OPTICAL IMAGING SYSTEM

CROSS-REFERENCE TO RELATED APPLICATIONS

This application is a continuation of International Application No. PCT/CN2018/085631, filed on May 4, 2018, which claims priorities and rights to Chinese Patent Application No. 201810011340.2 filed with the China National Intellectual Property Administration (CNIPA) on Jan. 5, 2018 and Chinese Patent Application No. 201820017804.6 filed with the CNIPA on Jan. 5, 2018. All of the aforementioned applications are hereby incorporated by reference in their entireties.

TECHNICAL FIELD

The present disclosure relates to an optical imaging system, and more specifically to an optical imaging system including four lenses.

BACKGROUND

With the development of chip technologies such as the charge-coupled device (CCD) or the complementary metal-oxide semiconductor (CMOS) element, their applications extend to fields such as infrared imaging, distance detection, and infrared recognition. At the same time, with the continuous development of portable electronic products, corresponding requirements have been put forward for miniaturization of the counterpart optical imaging systems.

Existing miniaturized optical imaging systems typically have large F-numbers, and a small amount of light admitted may result in poor imaging performance. Therefore, there is a need for an optical imaging system that has characteristics such as miniaturization, large aperture, and being capable of imaging based on the infrared band, in order to ensure the application of the optical imaging system in the fields such as detection and recognition.

SUMMARY

The present disclosure provides an optical imaging system applicable to portable electronic products and may at least solve or partially solve at least one of the above disadvantages in the existing technology.

According to an aspect, the present disclosure provides an optical imaging system. The imaging system includes, sequentially along an optical axis from an object side to an image side: a first lens, a second lens, a third lens, and a fourth lens. The first lens, the third lens, and the fourth lens each has a positive refractive power or a negative refractive power. The second lens may have a positive refractive power, and an image-side surface of the second lens may be a concave surface. An image-side surface of the fourth lens may be a concave surface. An effective half-diameter DT11 of an object-side surface of the first lens, an effective half-diameter DT21 of an object-side surface of the second lens, an effective half-diameter DT32 of an image-side surface of the third lens, an effective half-diameter DT42 of the image-side surface of the fourth lens and an entrance pupil diameter EPD of the optical imaging system may satisfy: $(DT11+DT21+DT32+DT42)/EPD \leq 2.4$.

In an implementation, the optical imaging system may further include an infrared bandpass filter disposed between the fourth lens and an image plane of the optical imaging system, and a passband of the infrared bandpass filter may be 750 nm to 1000 nm. Further, the passband of the infrared bandpass filter may be 850 nm to 940 nm.

In an implementation, a total effective focal length f of the optical imaging system and the entrance pupil diameter EPD of the optical imaging system may satisfy: $f/EPD \leq 1.4$.

In an implementation, the fourth lens may have a positive refractive power, and an effective focal length f4 of the fourth lens and the total effective focal length f of the optical imaging system may satisfy: $1 \leq f4/f \leq 8$.

In an implementation, the total effective focal length f of the optical imaging system and a center thickness CT4 of the fourth lens on the optical axis may satisfy: $6 \leq f/CT4 \leq 10$.

In an implementation, a radius of curvature R3 of the object-side surface of the second lens and a radius of curvature R4 of the image-side surface of the second lens may satisfy: $-7 \leq (R3+R4)/(R3-R4) \leq -4$.

In an implementation, the total effective focal length f of the optical imaging system, an effective focal length f1 of the first lens, and an effective focal length f2 of the second lens may satisfy: $0.5 \leq |f/f1|+|f/f2| \leq 1$.

In an implementation, an effective focal length f2 of the second lens and a radius of curvature R4 of the image-side surface of the second lens may satisfy: $2 \leq f2/R4 \leq 4$.

In an implementation, a center thickness CT1 of the first lens on the optical axis and a spacing distance T23 of the second lens and the third lens on the optical axis may satisfy: $1 \leq CT1/T23 \leq 2$.

In an implementation, a radius of curvature R4 of the image-side surface of the second lens and a radius of curvature R8 of the image-side surface of the fourth lens may satisfy: $4 \leq (R4+R8)/(R4-R8) \leq 7$.

According to another aspect, the present disclosure provides an optical imaging system. The imaging system includes, sequentially along an optical axis from an object side to an image side: a first lens, a second lens, a third lens, and a fourth lens. The first lens, the third lens, and the fourth lens each has a positive refractive power or a negative refractive power. The second lens may have a positive refractive power, and an image-side surface of the second lens may be a concave surface. An image-side surface of the fourth lens may be a concave surface. An effective focal length f4 of the fourth lens and a total effective focal length f of the optical imaging system satisfy: $1 \leq f4/f \leq 8$.

According to another aspect, the present disclosure further provides an optical imaging system. The imaging system includes, sequentially along an optical axis from an object side to an image side: a first lens, a second lens, a third lens, and a fourth lens. The first lens, the third lens, and the fourth lens each has a positive refractive power or a negative refractive power. The second lens may have a positive refractive power, and an image-side surface of the second lens may be a concave surface. An image-side surface of the fourth lens may be a concave surface. A total effective focal length f of the optical imaging system and a center thickness CT4 of the fourth lens on the optical axis may satisfy: $6 \leq f/CT4 \leq 10$.

According to another aspect, the present disclosure further provides an optical imaging system. The imaging system includes, sequentially along an optical axis from an object side to an image side: a first lens, a second lens, a third lens, and a fourth lens. The first lens, the third lens, and the fourth lens each has a positive refractive power or a negative refractive power. The second lens may have a positive refractive power, and an image-side surface of the second lens may be a concave surface. An image-side surface of the fourth lens may be a concave surface. A radius of curvature R3 of an object-side surface of the second lens and a radius of curvature R4 of the image-side surface of the second lens may satisfy: $-7 \leq (R3+R4)/(R3-R4) \leq -4$.

According to another aspect, the present disclosure further provides an optical imaging system. The imaging system includes, sequentially along an optical axis from an object side to an image side: a first lens, a second lens, a third lens, and a fourth lens. The first lens, the third lens, and the fourth lens each has a positive refractive power or a negative refractive power. The second lens may have a positive refractive power, and an image-side surface of the second lens may be a concave surface. An image-side surface of the fourth lens may be a concave surface. A total effective focal length f of the optical imaging system, an effective focal length f1 of the first lens, and an effective focal length f2 of the second lens may satisfy: $0.5 \leq |f/f1| + |f/f2| \leq 1$.

According to another aspect, the present disclosure further provides an optical imaging system. The imaging system includes, sequentially along an optical axis from an object side to an image side: a first lens, a second lens, a third lens, and a fourth lens. The first lens, the third lens, and the fourth lens each has a positive refractive power or a negative refractive power. The second lens may have a positive refractive power, and an image-side surface of the second lens may be a concave surface. An image-side surface of the fourth lens may be a concave surface. A center thickness CT1 of the first lens on the optical axis and a spacing distance T23 of the second lens and the third lens on the optical axis may satisfy: $1 \leq CT1/T23 \leq 2$.

According to another aspect, the present disclosure further provides an optical imaging system. The imaging system includes, sequentially along an optical axis from an object side to an image side: a first lens, a second lens, a third lens, and a fourth lens. The first lens, the third lens, and the fourth lens each has a positive refractive power or a negative refractive power. The second lens may have a positive refractive power, and an image-side surface of the second lens may be a concave surface. An image-side surface of the fourth lens may be a concave surface. A radius of curvature R4 of the image-side surface of the second lens and a radius of curvature R8 of the image-side surface of the fourth lens may satisfy: $4 \leq (R4+R8)/(R4-R8) \leq 7$.

In the present disclosure, multiple lenses (e.g., four lenses) are used. By reasonably distributing the refractive powers and the surface types of the lenses, the center thicknesses of the lenses and the spacing distances between the lenses, the optical imaging system has at least one advantageous effect of large aperture, miniaturization, high imaging quality and imaging based on infrared waveband, and the like.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings.

DETAILED DESCRIPTION OF EMBODIMENTS

Figure 1:
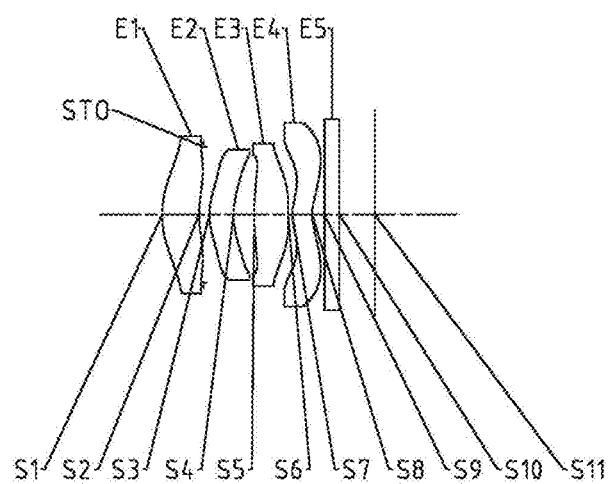
FIG. 1 is a schematic structural diagram illustrating an optical imaging system according to Embodiment 1 of the present disclosure.

For a better understanding of the present disclosure, various aspects of the present disclosure will be described in more detail with reference to the accompanying drawings. It should be understood that the detailed description is merely an illustration of the exemplary implementations of the present disclosure rather than a limitation on the scope of the present disclosure in any way. Throughout the specification, the identical reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

As used herein, the paraxial area refers to an area near the optical axis. If the surface of a lens is a convex surface and the position of the convex surface is not defined, it indicates that the surface of the lens is convex at least at the paraxial area; if the surface of a lens is a concave surface and the position of the concave surface is not defined, it indicates that the surface of the lens is concave at least at the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

The optical imaging system according to exemplary implementations of the present disclosure may include, for example, four lenses having refractive powers, that is, a first lens, a second lens, a third lens, and a fourth lens. The four lenses are sequentially arranged from an object side to an image side along an optical axis.

In an exemplary implementation, the first lens has a positive refractive power or a negative refractive power. The second lens may have a positive refractive power, and an image-side surface of the second lens may be a concave surface. The third lens has a positive refractive power or a negative refractive power. The fourth lens has a positive refractive power or a negative refractive power, and an image-side surface of the fourth lens may be a concave surface. The use of such refractive powers and surface type arrangement helps to shorten the total length of the imaging system, adjust the optical path, and reduce the lens aperture to achieve miniaturization of the module.

In an exemplary implementation, an object-side surface of the first lens may be a convex surface, and an image-side surface may be a concave surface.

In an exemplary implementation, an object-side surface of the second lens may be a convex surface.

In an exemplary implementation, an object-side surface of the third lens may be a convex surface.

In an exemplary implementation, the fourth lens may have a positive refractive power and an object-side surface of the fourth lens may be a convex surface.

In an exemplary implementation, the optical imaging system of the present disclosure may satisfy the conditional expression: $(DT11+DT21+DT32+DT42)/EPD \leq 2.4$, here, DT11 is the effective half-diameter of the object-side surface of the first lens, DT21 is the effective half-diameter of the object-side surface of the second lens, DT32 is the effective half-diameter of the image-side surface of the third lens, DT42 is the effective half-diameter of the image-side surface of the fourth lens and EPD is the entrance pupil diameter of the optical imaging system. More specifically, DT11, DT21, DT32, DT42, and EPD may further satisfy: $2.25 \leq (DT11+DT21+DT32+DT42)/EPD \leq 2.36$. Satisfying the conditional expression $(DT11+DT21+DT32+DT42)/EPD \leq 2.4$ is beneficial for increasing the amount of light entering the optical imaging system per unit time, improving the imaging quality (increasing the signal-to-noise ratio, and improving the detection and recognition accuracy). At the same time, it is conducive to compacting the structure of the optical imaging system and ensuring miniaturization.

In an exemplary implementation, the optical imaging system of the present disclosure may include an infrared bandpass filter disposed between the fourth lens and an image plane, and the passband of the infrared bandpass filter may be from about 750 nm to about 1000 nm. Further, the passband may be from about 850 nm to about 940 nm. The infrared bandpass filter is disposed between the fourth lens and the image plane to allow infrared light to pass through and filter stray light to eliminate the signal interference caused by non-infrared light, for example, imaging blur due to chromatic aberrations introduced by the non-infrared light.

In an exemplary implementation, the optical imaging system of the present disclosure may satisfy the conditional expression: $f/EPD \leq 1.4$, here, f is the total effective focal length of the optical imaging system and EPD is the entrance pupil diameter of the optical imaging system. More specifically, f and EPD may further satisfy: $1.08 \leq f/EPD \leq 1.33$. Satisfying the conditional expression $f/EPD \leq 1.4$ may effectively improve the energy density on the image plane, improve the problem that the signal-to-noise ratio of the output signal (i.e., the infrared imaging quality or the recognition detection accuracy) is low caused by that the quantum efficiency (QE) of the chip is low when receiving infrared light.

In an exemplary implementation, the optical imaging system of the present disclosure may satisfy the conditional expression: $1 \leq f4/f \leq 8$, here, f4 is the effective focal length of the fourth lens, and f is the total effective focal length of the optical imaging system. More specifically, f4 and f may further satisfy: $1.39 \leq f4/f \leq 7.23$. Satisfying the conditional expression $1 \leq f4/f \leq 8$ is beneficial for shortening the total length of the imaging system and realize miniaturization of the module. It is advantageous for the imaging system to be more widely used in various portable electronic products or more widely applied to various fields that have small size requirements for the module.

In an exemplary implementation, the optical imaging system of the present disclosure may satisfy the conditional expression: $6 \le f/CT4 \le 10$, here, f is the total effective focal length of the optical imaging system, and CT4 is the center thickness of the fourth lens on the optical axis. More specifically, f and CT4 may further satisfy: $6.21 \le f/CT4 \le 9.37$. Satisfying the conditional expression $6 \le f/CT4 \le 10$ is beneficial for adjusting the structural layout of the optical imaging system, and achieve a good balance between reducing the overall length of the module and ensuring the processability of the fourth lens.

In an exemplary implementation, the optical imaging system of the present disclosure may satisfy the conditional expression: $-7 \le (R3+R4)/(R3-R4) \le -4$, here, R3 is the radius of curvature of the object-side surface of the second lens, and R4 is the radius of curvature of the image-side surface of the second lens. More specifically, R3 and R4 may further satisfy: $-6.04 \le (R3+R4)/(R3-R4) \le -4.31$. Satisfying the conditional expression $-7 \le (R3+R4)/(R3-R4) \le -4$ may effectively adjust the incident angle of each field-of-view incident on the third lens; at the same time, may improve a spherical aberration of the imaging system.

In an exemplary implementation, the optical imaging system of the present disclosure may satisfy the conditional expression: $0.5 \le |f/f1|+|f/f2| \le 1$, here, f is the total effective focal length of the optical imaging system, f1 is the effective focal length of the first lens, and f2 is the effective focal length of the second lens. More specifically, f, f1, and f2 may further satisfy: $0.55 \le |f/f1|+|f/f2| \le 0.80$, for example, $0.60 \le |f/f1|+|f/f2| \le 0.77$. Satisfying the conditional expression $0.5 \le |f/f1|+|f/f2| \le 1$ may effectively avoid the excessive concentration of refractive powers, reduce the sensitivity of the imaging system on the tolerance, and improve the production yield.

In an exemplary implementation, the optical imaging system of the present disclosure may satisfy the conditional expression: $2 \le f2/R4 \le 4$, here, f2 is the effective focal length of the second lens, and R4 is the radius of curvature of the image-side surface of the second lens. More specifically, f2 and R4 may further satisfy: $2.45 \le f2/R4 \le 3.61$. Satisfying the conditional expression $2 \le f2/R4 \le 4$ is advantageous for improving the processing processability of the second lens and reducing the manufacturing difficulty.

In an exemplary implementation, the optical imaging system of the present disclosure may satisfy the conditional expression: $1 \le CT1/T23 \le 2$, here, CT1 is the center thickness of the first lens on the optical axis, and T23 is the spacing distance on the optical axis between the second lens and the third lens. More specifically, CT1 and T23 may further satisfy: $1.26 \le CT1/T23 \le 1.86$. Satisfying the conditional expression $1 \le CT1/T23 \le 2$ is beneficial for properly distributing the on-axis space of the optical imaging system to shorten the total length of the system. It is beneficial to the lens assembly to improve the production yield of the imaging system.

In an exemplary implementation, the optical imaging system of the present disclosure may satisfy the conditional expression: $4 \le (R4+R8)/(R4-R8) \le 7$, here, R4 is the radius of curvature of the image-side surface of the second lens, and R8 is the radius of curvature of the image-side surface of the fourth lens. More specifically, R4 and R8 may further satisfy: $4.05 \le (R4+R8)/(R4-R8) \le 6.40$. Satisfying the conditional expression $4 \le (R4+R8)/(R4-R8) \le 7$ may effectively adjust the incident angle of the light from the off-axis field-of-view, and aberrations of the off-axis field-of-view area may be corrected.

Alternatively, the optical imaging system may also include at least one diaphragm STO for improving the imaging quality. The diaphragm may be disposed between the first lens and the second lens.

Alternatively, the optical imaging system may further include a glass for protecting the photosensitive element on the image plane.

The optical imaging system according to the above implementations of the present disclosure may use multiple lenses, for example, four lenses as described above. By reasonably distributing the refractive power, the surface type of each lens, the center thickness of each lens, the spacing distances on the axis between the lenses, etc., the volume of the imaging system may be effectively reduced, the sensitivity of the imaging system may be reduced, and the processability of the imaging system may be improved, making the optical imaging system more conducive to production and processing and applicable to portable electronic products. At the same time, the optical imaging system with the above configuration also has beneficial effects such as large aperture, high imaging quality, low sensibility and imaging based on infrared bandwave.

In the implementations of the present disclosure, at least one of the surfaces of the each lens is an aspheric surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of improving a distortion aberration and an astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging system without departing from the technical solution claimed by the present disclosure. For example, although four lenses are described as an example in the implementations, the optical imaging system is not limited to include four lenses. If desired, the optical imaging system may also include other numbers of lenses.

Specific embodiments of the optical imaging system that may be applied to the above implementations are further described below with reference to the accompanying drawings.

Embodiment 1

An optical imaging system according to Embodiment 1 of the present disclosure is described below with reference to FIGS. 1-2C. FIG. 1 is a schematic structural diagram illustrating an optical imaging system according to Embodiment 1 of the present disclosure.

As shown in FIG. 1, the optical imaging system according to the exemplary implementations of the present disclosure includes, sequentially along the optical axis from the object side to the image side: a first lens E1, a diaphragm STO, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10, which may be an infrared bandpass filter and a passband of the optical filter E5 may be about 750 nm to about 1000 nm, and further, the passband may be about 850 nm to about 940 nm. Light from an object sequentially passes through the surfaces S1-S10 and finally forms an image on the image plane S11.

Table 1 shows the surface type, the radius of curvature, the thickness, the material and the conic coefficient of each lens of the optical imaging system in Embodiment 1. The radius of curvature and the thickness are shown in millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.3786 | 0.5193 | 1.62 | 23.5 | −0.9569 |
| S2 | aspheric | 1.4827 | 0.0950 | | | −12.6968 |
| STO | spherical | infinite | 0.0506 | | | |
| S3 | aspheric | 0.8983 | 0.3420 | 1.63 | 56.2 | −0.8498 |
| S4 | aspheric | 1.2546 | 0.2912 | | | 1.1300 |
| S5 | aspheric | 4.7576 | 0.4770 | 1.63 | 56.2 | 15.6082 |
| S6 | aspheric | 4.5576 | 0.0592 | | | 0.0000 |
| S7 | aspheric | 0.6303 | 0.2799 | 1.63 | 56.2 | −5.2837 |
| S8 | aspheric | 0.8171 | 0.1757 | | | −1.4914 |
| S9 | spherical | infinite | 0.2100 | 1.52 | 64.2 | |
| S10 | spherical | infinite | 0.5000 | | | |
| S11 | spherical | infinite | | | | |

As may be seen from Table 1, the object-side surface and the image-side surface of any one of the first lens E1 to the fourth lens E4 are aspheric surfaces. In the present embodiment, the surface type x of each aspheric lens may be defined by, but not limited to, the following aspheric formula:

$$x = \frac{ch^2}{1+\sqrt{1-(k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below gives the high-order coefficients $A_4, A_6, A_8, A_{10}, A_{12}, A_{14}$ and $A_{16}$ applicable to the aspheric surfaces S1-S8 in Embodiment 1.

TABLE 2

| surface number | A4 | A6 | A8 | A10 | A12 | A14 | A16 |
|---|---|---|---|---|---|---|---|
| S1 | −1.0463E−01 | 5.7266E−02 | 1.1116E−02 | −1.0475E−01 | −2.3200E−01 | 3.9455E−01 | −1.3956E−01 |
| S2 | −3.3664E−01 | 1.8988E−01 | 7.4094E−03 | −1.9789E−01 | 2.2909E−01 | −4.9590E−02 | −6.5543E−03 |
| S3 | −7.5919E−01 | 8.1665E−01 | −3.5086E+00 | 1.0010E+01 | −1.2324E+01 | 6.9341E+00 | −1.3160E+00 |
| S4 | −9.9562E−02 | −1.0359E+00 | −9.3552E−01 | 1.1416E+01 | −2.6991E+01 | 2.9269E+01 | −1.3210E+01 |
| S5 | −6.6386E−02 | 2.5183E+00 | −2.1160E+01 | 8.0507E+01 | −1.6388E+02 | 1.7111E+02 | −7.2431E+01 |
| S6 | −2.9865E+00 | 1.3161E+01 | −3.5586E+01 | 5.8951E+01 | −5.7988E+01 | 3.1188E+01 | −7.0558E+00 |
| S7 | −1.9683E+00 | 5.1623E+00 | −1.0163E+01 | 1.2966E+01 | −9.7161E+00 | 3.9296E+00 | −6.6550E−01 |
| S8 | −1.2155E+00 | 1.8751E+00 | −2.1103E+00 | 1.5418E+00 | −6.4604E−01 | 1.1399E−01 | 0.0000E+00 |

Table 3 gives the effective focal lengths f1-f4 of the lenses in Embodiment 1, the total effective focal length f of the optical imaging system, the distance TTL on the optical axis from the center of the object-side surface S1 of the first lens E1 to the image plane S11, and the half of the diagonal length ImgH of the effective pixel area on the image plane S11.

TABLE 3

| f1 (mm) | 10.98    | f (mm)    | 2.10 |
|---------|----------|-----------|------|
| f2 (mm) | 4.52     | TTL (mm)  | 3.00 |
| f3 (mm) | −1156.17 | ImgH (mm) | 1.56 |
| f4 (mm) | 3.46     |           |      |

The optical imaging system in Embodiment 1 satisfies:

(DT11+DT21+DT32+DT42)/EPD=2.32, here, DT11 is the effective half-diameter of the object-side surface S1 of the first lens E1, DT21 is the effective half-diameter of the object-side surface S3 of the second lens E2, DT32 is the effective half-diameter of the image-side surface S6 of the third lens E3, DT42 is the effective half-diameter of the image-side surface S8 of the fourth lens E4, and EPD is the entrance pupil diameter of the optical imaging system;

f/EPD=1.12, here, f is the total effective focal length of the optical imaging system, and EPD is the entrance pupil diameter of the optical imaging system;

f4/f=1.64, here, f4 is the effective focal length of the fourth lens E4, and f is the total effective focal length of the optical imaging system;

f/CT4=7.51, here, f is the total effective focal length of the optical imaging system, and CT4 is the center thickness of the fourth lens E4 on the optical axis;

(R3+R4)/(R3−R4)=−6.04, here, R3 is the radius of curvature of the object-side surface S3 of the second lens E2, and R4 is the radius of curvature of the image-side surface S4 of the second lens E2;

|f/f1|+|f/f2|=0.66, here, f is the total effective focal length of the optical imaging system, f1 is the effective focal length of the first lens E1, and f2 is the effective focal length of the second lens E2;

f2/R4=3.61, here, f2 is the effective focal length of the second lens E2, and R4 is the radius of curvature of the image-side surface S4 of the second lens E2;

CT1/T23=1.78, here, CT1 is the center thickness of the first lens E1 on the optical axis, and T23 is the spacing distance on the optical axis between the second lens E2 and the third lens E3;

(R4+R8)/(R4−R8)=4.74, here, R4 is the radius of curvature of the image-side surface S4 of the second lens E2, and R8 is the radius of curvature of the image-side surface S8 of the fourth lens E4.

Figure 2A:
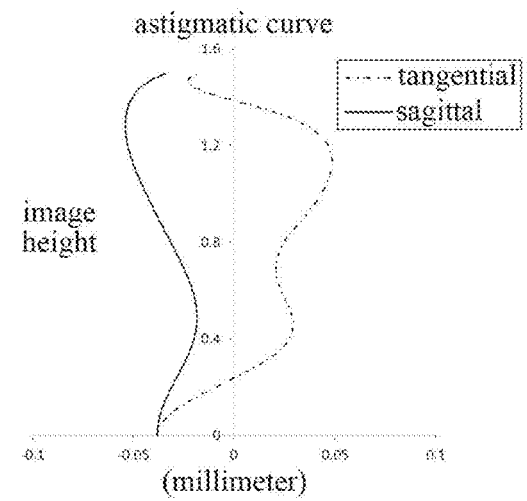
FIGS. 2A-2C respectively illustrate an astigmatic curve, a distortion curve and a relative illumination curve of the optical imaging system according to Embodiment 1.
Figure 2B:
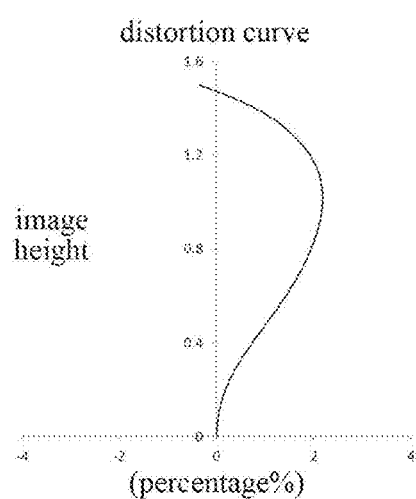
Figure 2C:
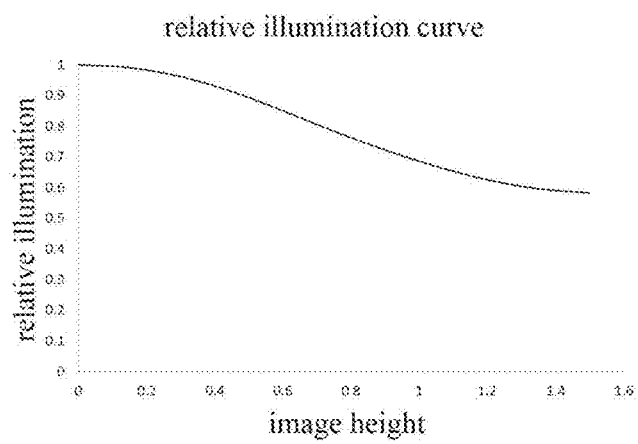

FIG. 2A illustrates the astigmatic curve of the optical imaging system according to Embodiment 1, representing a curvature of the tangential image plane and a curvature of the sagittal image plane. FIG. 2B illustrates the distortion curve of the optical imaging system according to Embodiment 1, representing amounts of distortion at different viewing angles. FIG. 2C illustrates the relative illumination curve of the optical imaging system according to Embodiment 1, representing relative illuminations of different image heights on the image plane. It can be seen from FIGS. 2A-2C that the optical imaging system according to Embodiment 1 can achieve a good imaging quality.

Embodiment 2

Figure 3:
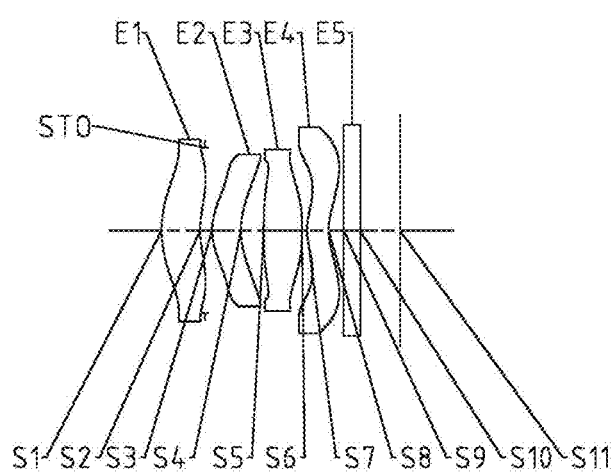
FIG. 3 is a schematic structural diagram illustrating an optical imaging system according to Embodiment 2 of the present disclosure.

An optical imaging system according to Embodiment 2 of the present disclosure is described below with reference to FIGS. 3-4C. In the present embodiment and the following embodiments, for the purpose of brevity, the description of parts similar to those in Embodiment 1 will be omitted. FIG. 3 is a schematic structural diagram illustrating the optical imaging system according to Embodiment 2 of the present disclosure.

As shown in FIG. 3, the optical imaging system according to the exemplary implementations of the present disclosure sequentially includes, along the optical axis from the object side to the image side: a first lens E1, a diaphragm STO, a second lens E2, a third lens E3, a fourth lens E4, an optical filter E5 and an image plane S11.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10, which may be an infrared bandpass filter and a passband of the optical filter E5 may be about 750 nm to about 1000 nm, and further, the passband may be about 850 nm to about 940 nm. Light from an object sequentially passes through the surfaces S1-S10 and finally forms an image on the image plane S11.

Table 4 shows the surface type, the radius of curvature, the thickness, the material and the conic coefficient of each lens of the optical imaging system in Embodiment 2. The radius of curvature and the thickness are shown in millimeters (mm).

TABLE 4

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.3532 | 0.4840 | 1.62 | 23.5 | −1.6164 |
| S2 | aspheric | 1.1532 | 0.1023 | | | −10.1087 |
| STO | spherical | infinite | 0.0500 | | | |
| S3 | aspheric | 0.7330 | 0.3628 | 1.63 | 56.2 | −1.1071 |
| S4 | aspheric | 1.1765 | 0.2856 | | | 0.6376 |
| S5 | aspheric | 7.5676 | 0.4798 | 1.63 | 56.2 | 66.0945 |

TABLE 4-continued

| surface number | surface type | radius of curvature | thickness | material refractive index | abbe number | conic coefficient |
|---|---|---|---|---|---|---|
| S6 | aspheric | 18.9732 | 0.0636 | | | 0.0000 |
| S7 | aspheric | 0.6547 | 0.2730 | 1.63 | 56.2 | −4.6502 |
| S8 | aspheric | 0.7792 | 0.1890 | | | −1.4849 |
| S9 | spherical | infinite | 0.2100 | 1.52 | 64.2 | |
| S10 | spherical | infinite | 0.5000 | | | |
| S11 | spherical | infinite | | | | |

As may be seen from Table 4, in Embodiment 2, the object-side surface and the image-side surface of any one of the first lens E1 to the fourth lens E4 are aspheric surfaces. Table 5 shows the high-order coefficients of the aspheric surfaces applicable in Embodiment 2. Here, the surface types of the aspheric surfaces may be defined by the formula (1) given in the above Embodiment 1.

TABLE 5

| surface number | A4 | A6 | A8 | A10 | A12 | A14 | A16 |
|---|---|---|---|---|---|---|---|
| S1 | −1.2651E−01 | 8.0033E−02 | 2.2395E−02 | −1.1529E−01 | −2.4184E−01 | 3.9179E−01 | −1.3549E−01 |
| S2 | −3.6715E−01 | 1.7736E−01 | 1.7900E−02 | −1.8917E−01 | 2.2260E−01 | −6.8851E−02 | −6.2409E−03 |
| S3 | −7.4745E−01 | 1.5381E+00 | −7.3340E+00 | 1.7298E+01 | −1.9240E+01 | 1.0284E+01 | −2.0539E+00 |
| S4 | 2.4835E−01 | −2.1812E+00 | 3.0295E+00 | −3.3680E+00 | 5.3130E+00 | −5.7962E+00 | 2.0575E+00 |
| S5 | 2.2216E−02 | 2.3694E+00 | −1.7549E+01 | 6.1228E+01 | −1.1661E+02 | 1.1502E+02 | −4.6229E+01 |
| S6 | −2.5445E+00 | 1.1451E+01 | −2.9836E+01 | 4.7436E+01 | −4.4823E+01 | 2.3271E+01 | −5.1235E+00 |
| S7 | −1.9585E+00 | 5.7441E+00 | −1.1958E+01 | 1.5376E+01 | −1.1801E+01 | 5.1024E+00 | −9.6116E−01 |
| S8 | −1.3026E+00 | 2.3608E+00 | −3.1221E+00 | 2.5243E+00 | −1.1080E+00 | 1.9890E−01 | 0.0000E+00 |

Table 6 gives the effective focal lengths f1-f4 of the lenses in Embodiment 2, the total effective focal length f of the optical imaging system, the distance TTL on the optical axis from the center of the object-side surface S1 of the first lens E1 to the image plane S11, and the half of the diagonal length ImgH of the effective pixel area on the image plane S11.

TABLE 6

| f1 (mm) | −163.55 | f (mm) | 2.10 |
|---|---|---|---|
| f2 (mm) | 2.89 | TTL (mm) | 3.00 |
| f3 (mm) | 23.61 | ImgH (mm) | 1.57 |
| f4 (mm) | 4.44 | | |

Figure 4A:
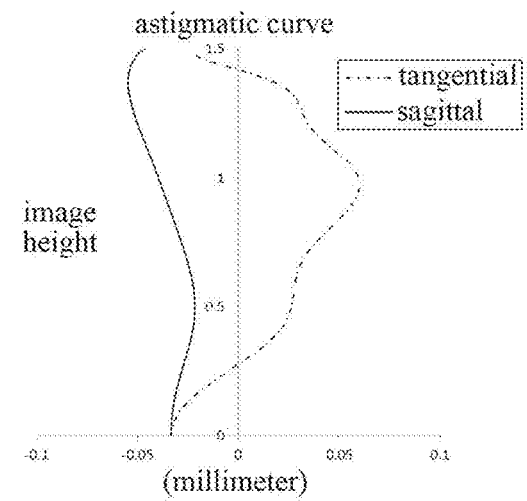
FIGS. 4A-4C respectively illustrate an astigmatic curve, a distortion curve and a relative illumination curve of the optical imaging system according to Embodiment 2.
Figure 4B:
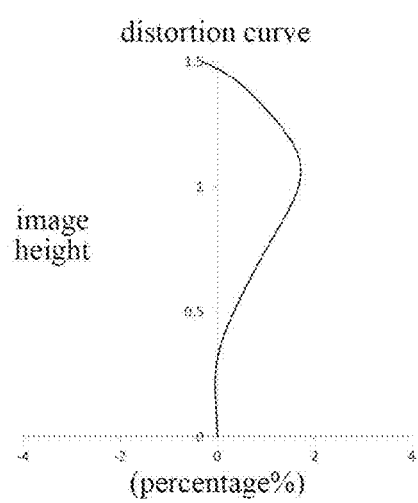
Figure 4C:
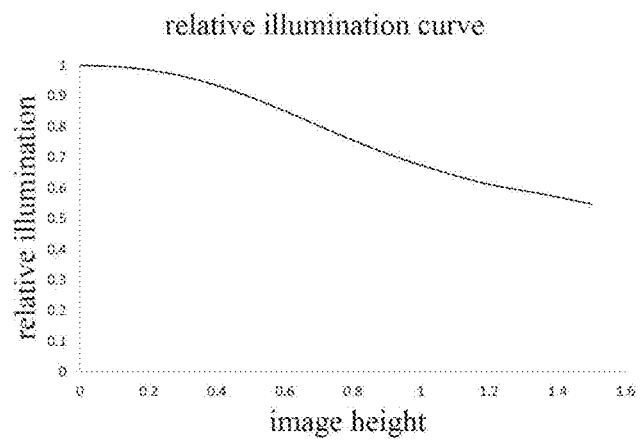

FIG. 4A illustrates the astigmatic curve of the optical imaging system according to Embodiment 2, representing a curvature of the tangential image plane and a curvature of the sagittal image plane. FIG. 4B illustrates the distortion curve of the optical imaging system according to Embodiment 2, representing amounts of distortion at different viewing angles. FIG. 4C illustrates the relative illumination curve of the optical imaging system according to Embodiment 2, representing relative illuminations of different image heights on the image plane. It can be seen from FIGS. 4A-4C that the optical imaging system according to Embodiment 2 can achieve a good imaging quality.

Embodiment 3

Figure 5:
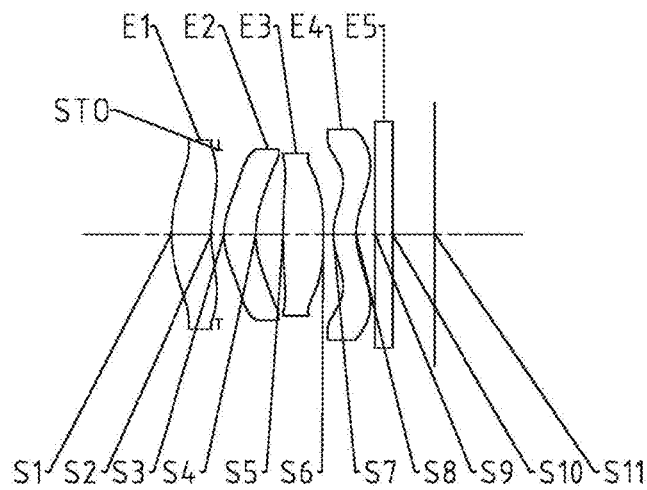
FIG. 5 is a schematic structural diagram illustrating an optical imaging system according to Embodiment 3 of the present disclosure.

An optical imaging system according to Embodiment 3 of the present disclosure is described below with reference to FIGS. 5-6C. FIG. 5 is a schematic structural diagram illustrating the optical imaging system according to Embodiment 3 of the present disclosure.

As shown in FIG. 5, the optical imaging system according to the exemplary implementations of the present disclosure sequentially includes, along the optical axis from the object side to the image side: a first lens E1, a diaphragm STO, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10, which may be an infrared bandpass filter and a passband of the optical filter E5 may be about 750 nm to about 1000 nm, and further, the passband may be about 850 nm to about 940 nm. Light from an object sequentially passes through the surfaces S1-S10 and finally forms an image on the image plane S11.

Table 7 shows the surface type, the radius of curvature, the thickness, the material and the conic coefficient of each lens of the optical imaging system in Embodiment 3. The radius of curvature and the thickness are shown in millimeters (mm).

TABLE 7

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.5244 | 0.4780 | 1.62 | 23.5 | −0.7134 |
| S2 | aspheric | 1.3687 | 0.1030 | | | −9.2440 |
| STO | spherical | infinite | 0.0500 | | | |
| S3 | aspheric | 0.8264 | 0.3796 | 1.63 | 56.2 | −1.0143 |
| S4 | aspheric | 1.2561 | 0.3237 | | | 0.7448 |
| S5 | aspheric | 9.6369 | 0.4761 | 1.63 | 56.2 | 0.0000 |
| S6 | aspheric | 17.2784 | 0.1186 | | | 0.0000 |
| S7 | aspheric | 0.6161 | 0.2717 | 1.63 | 56.2 | −10.9525 |
| S8 | aspheric | 0.8596 | 0.2256 | | | −1.1479 |
| S9 | spherical | infinite | 0.2100 | 1.52 | 64.2 | |
| S10 | spherical | infinite | 0.5000 | | | |
| S11 | spherical | infinite | | | | |

As may be seen from Table 7, in Embodiment 3, the object-side surface and the image-side surface of any one of the first lens E1 to the fourth lens E4 are aspheric surfaces. Table 8 shows the high-order coefficients of the aspheric surfaces applicable in Embodiment 3. Here, the surface types of the aspheric surfaces may be defined by the formula (1) given in the above Embodiment 1.

TABLE 8

| surface number | A4 | A6 | A8 | A10 | A12 | A14 | A16 |
|---|---|---|---|---|---|---|---|
| S1 | −8.7530E−02 | −4.0681E−02 | 9.8113E−02 | −6.0798E−02 | −2.6039E−01 | 3.3429E−01 | −1.0963E−01 |
| S2 | −3.1146E−01 | 1.3145E−01 | 1.2977E−02 | −1.3606E−01 | 1.6401E−01 | −5.2946E−02 | −7.3639E−03 |
| S3 | −4.3477E−01 | 1.7804E−01 | −1.1794E+00 | 2.2011E+00 | −3.8003E−01 | −1.4225E+00 | 7.8441E−01 |
| S4 | −4.6458E−02 | 5.7724E−01 | −7.5722E+00 | 2.2683E+01 | −3.4682E+01 | 2.8206E+01 | −9.8064E+00 |
| S5 | 1.2009E−01 | −1.8264E−01 | −1.2267E+00 | 6.4015E+00 | −1.5411E+01 | 1.7624E+01 | −7.5308E+00 |
| S6 | −1.7492E+00 | 7.6498E+00 | −2.3437E+01 | 4.6343E+01 | −5.6142E+01 | 3.7563E+01 | −1.0412E+01 |
| S7 | 6.0053E−01 | −4.4092E+00 | 1.0136E+01 | −1.3689E+01 | 1.0800E+01 | −4.4580E+00 | 7.3851E−01 |
| S8 | −5.5001E−01 | −2.5783E−02 | 4.6434E−01 | −4.5129E−01 | 1.8053E−01 | −2.6277E−02 | 0.0000E+00 |

Table 9 gives the effective focal lengths f1-f4 of the lenses in Embodiment 3, the total effective focal length f of the optical imaging system, the distance TTL on the optical axis from the center of the object-side surface S1 of the first lens E1 to the image plane S11, and the half of the diagonal length ImgH of the effective pixel area on the image plane S11.

TABLE 9

| f1 (mm) | 127.57 | f (mm) | 2.07 |
|---|---|---|---|
| f2 (mm) | 3.52 | TTL (mm) | 3.14 |
| f3 (mm) | 40.59 | ImgH (mm) | 1.58 |
| f4 (mm) | 2.99 | | |

Figure 6A:
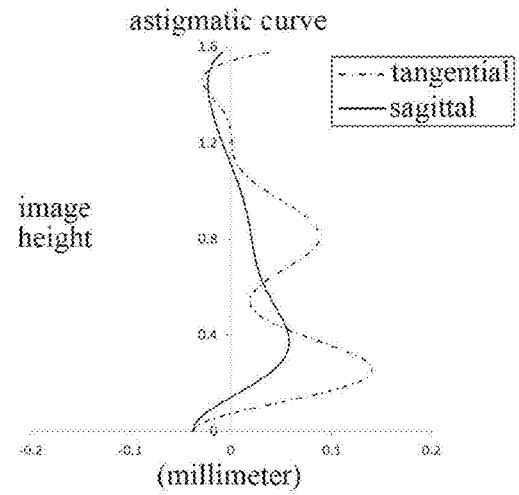
FIGS. 6A-6C respectively illustrate an astigmatic curve, a distortion curve and a relative illumination curve of the optical imaging system according to Embodiment 3.
Figure 6B:
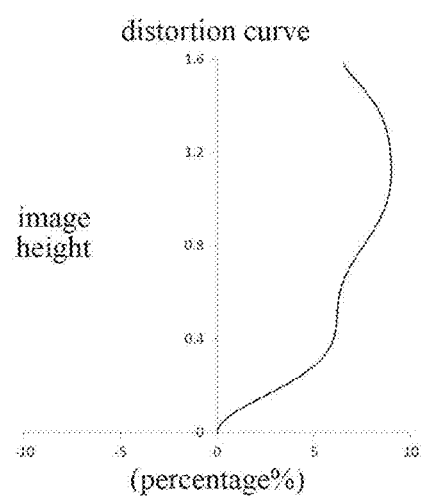
Figure 6C:
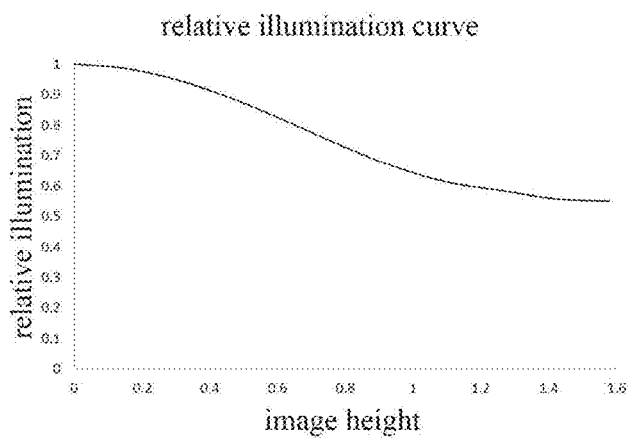

FIG. 6A illustrates the astigmatic curve of the optical imaging system according to Embodiment 3, representing a curvature of the tangential image plane and a curvature of the sagittal image plane. FIG. 6B illustrates the distortion curve of the optical imaging system according to Embodiment 3, representing amounts of distortion at different viewing angles. FIG. 6C illustrates the relative illumination curve of the optical imaging system according to Embodiment 3, representing relative illuminations of different image heights on the image plane. It can be seen from FIGS. 6A-6C that the optical imaging system according to Embodiment 3 can achieve a good imaging quality.

Embodiment 4

Figure 7:
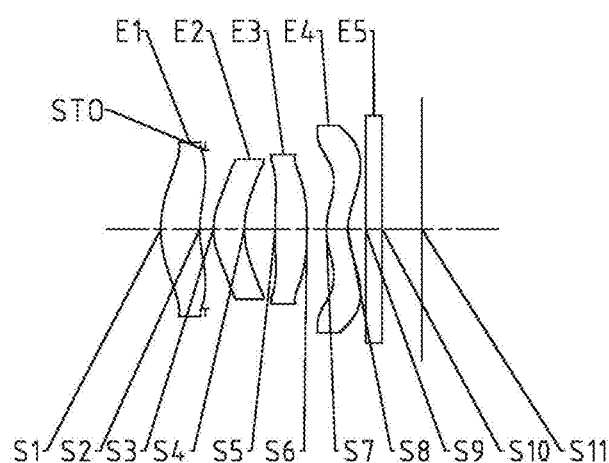
FIG. 7 is a schematic structural diagram illustrating an optical imaging system according to Embodiment 4 of the present disclosure.

An optical imaging system according to Embodiment 4 of the present disclosure is described below with reference to FIGS. 7-8C. FIG. 7 is a schematic structural diagram illustrating the optical imaging system according to Embodiment 4 of the present disclosure.

As shown in FIG. 7, the optical imaging system according to the exemplary implementations of the present disclosure sequentially includes, along the optical axis from the object side to the image side: a first lens E1, a diaphragm STO, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10, which may be an infrared bandpass filter and a passband of the optical filter E5 may be about 750 nm to about 1000 nm, and further, the passband may be about 850 nm to about 940 nm. Light from an object sequentially passes through the surfaces S1-S10 and finally forms an image on the image plane S11.

Table 10 shows the surface type, the radius of curvature, the thickness, the material and the conic coefficient of each lens of the optical imaging system in Embodiment 4. The radius of curvature and the thickness are shown in millimeters (mm).

TABLE 10

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.4733 | 0.4921 | 1.62 | 23.5 | −0.6155 |
| S2 | aspheric | 1.3746 | 0.1067 | | | −7.9615 |
| STO | spherical | infinite | 0.0664 | | | |
| S3 | aspheric | 0.8197 | 0.3925 | 1.63 | 56.2 | −0.9549 |
| S4 | aspheric | 1.2045 | 0.3902 | | | 0.5000 |
| S5 | aspheric | 10.8747 | 0.3995 | 1.63 | 56.2 | 0.0000 |
| S6 | aspheric | −9.2275 | 0.2458 | | | 0.0000 |
| S7 | aspheric | 0.8211 | 0.2711 | 1.63 | 56.2 | −5.3197 |

TABLE 10-continued

| surface number | surface type | radius of curvature | thickness | material refractive index | abbe number | conic coefficient |
|---|---|---|---|---|---|---|
| S8 | aspheric | 0.7954 | 0.2257 | | | −1.2777 |
| S9 | spherical | infinite | 0.2100 | 1.52 | 64.2 | |
| S10 | spherical | infinite | 0.4999 | | | |
| S11 | spherical | infinite | | | | |

As may be seen from Table 10, in Embodiment 4, the object-side surface and the image-side surface of any one of the first lens E1 to the fourth lens E4 are aspheric surfaces. Table 11 shows the high-order coefficients of the aspheric surfaces applicable in Embodiment 4. Here, the surface types of the aspheric surfaces may be defined by the formula (1) given in the above Embodiment 1.

TABLE 11

| surface number | A4 | A6 | A8 | A10 | A12 | A14 | A16 |
|---|---|---|---|---|---|---|---|
| S1 | −8.1951E−02 | −4.4190E−02 | 1.0140E−01 | −5.8839E−02 | −2.6256E−01 | 3.3042E−01 | −1.0898E−01 |
| S2 | −3.0563E−01 | 1.2717E−01 | 7.4926E−03 | −1.3778E−01 | 1.6502E−01 | −5.2830E−02 | −8.1007E−03 |
| S3 | −4.5395E−01 | 2.9674E−01 | −1.4305E+00 | 2.5115E+00 | −6.6503E−01 | −1.2039E+00 | 7.1037E−03 |
| S4 | −2.8266E−03 | −3.9252E−01 | −2.1567E+00 | 7.4543E+00 | −1.0726E+01 | 8.4784E+00 | −3.1366E+00 |
| S5 | −1.8912E−01 | 1.5317E+00 | −9.0480E+00 | 2.8470E+01 | −5.3049E+01 | 5.3251E+01 | −2.1807E+01 |
| S6 | −8.2437E−01 | 2.9277E+00 | −8.0628E+00 | 1.5015E+01 | −1.8242E+01 | 1.3209E+01 | −4.0978E+00 |
| S7 | −4.1028E−01 | −3.7776E−01 | 8.6033E−01 | −7.1606E−01 | 2.8322E−01 | 2.2602E−02 | −3.4061E−02 |
| S8 | −8.2501E−01 | 7.2226E−01 | −5.7931E−01 | 3.7072E−01 | −1.5888E−01 | 3.0234E−02 | 0.0000E+00 |

Table 12 gives the effective focal lengths f1-f4 of the lenses in Embodiment 4, the total effective focal length f of the optical imaging system, the distance TTL on the optical axis from the center of the object-side surface S1 of the first lens E1 to the image plane S11, and the half of the diagonal length ImgH of the effective pixel area on the image plane S11.

TABLE 12

| f1 (mm) | 37.01 | f (mm) | 2.54 |
|---|---|---|---|
| f2 (mm) | 3.61 | TTL (mm) | 3.30 |
| f3 (mm) | 9.56 | ImgH (mm) | 1.58 |
| f4 (mm) | 18.37 | | |

Figure 8A:
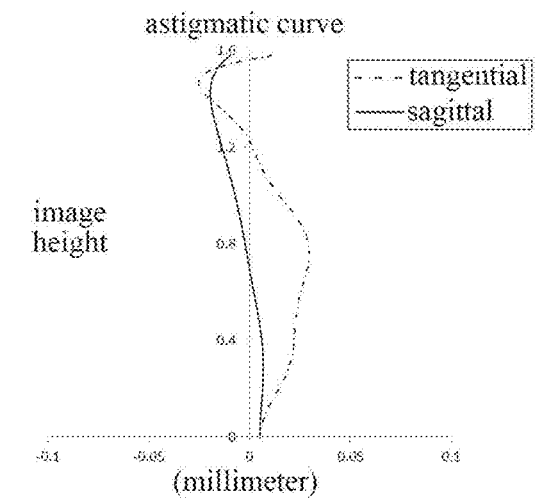
FIGS. 8A-8C respectively illustrate an astigmatic curve, a distortion curve and a relative illumination curve of the optical imaging system according to Embodiment 4.
Figure 8B:
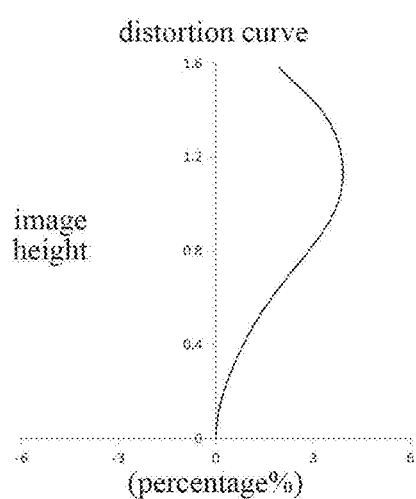
Figure 8C:
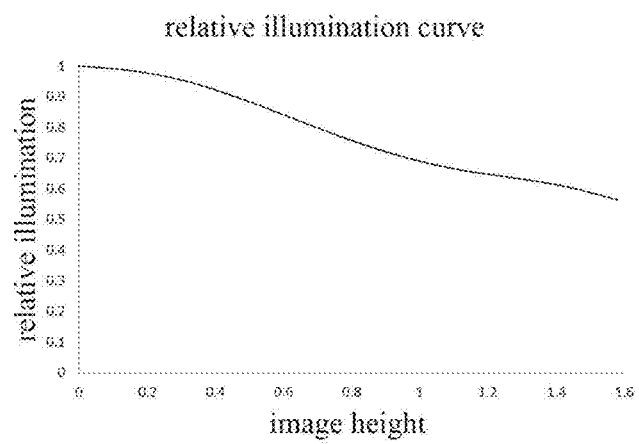

FIG. 8A illustrates the astigmatic curve of the optical imaging system according to Embodiment 4, representing a curvature of the tangential image plane and a curvature of the sagittal image plane. FIG. 8B illustrates the distortion curve of the optical imaging system according to Embodiment 4, representing amounts of distortion at different viewing angles. FIG. 8C illustrates the relative illumination curve of the optical imaging system according to Embodiment 4, representing relative illuminations of different image heights on the image plane. It can be seen from FIGS. 8A-8C that the optical imaging system according to Embodiment 4 can achieve a good imaging quality.

Embodiment 5

Figure 9:
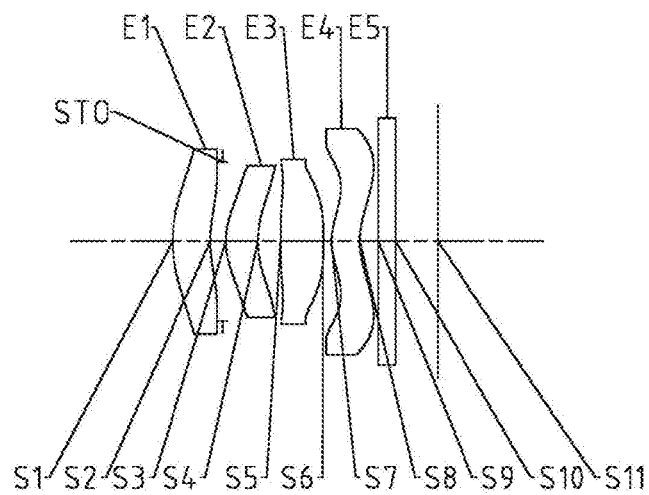
FIG. 9 is a schematic structural diagram illustrating an optical imaging system according to Embodiment 5 of the present disclosure.

An optical imaging system according to Embodiment 5 of the present disclosure is described below with reference to FIGS. 9-10C. FIG. 9 is a schematic structural diagram illustrating the optical imaging system according to Embodiment 5 of the present disclosure.

As shown in FIG. 9, the optical imaging system according to the exemplary implementations of the present disclosure includes, sequentially along the optical axis from the object side to the image side: a first lens E1, a diaphragm STO, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10, which may be an infrared bandpass filter and a passband of the optical filter E5 may be about 750 nm to about 1000 nm, and further, the passband may be about 850 nm to about 940 nm. Light from an object sequentially passes through the surfaces S1-S10 and finally forms an image on the image plane S11.

Table 13 shows the surface type, the radius of curvature, the thickness, the material and the conic coefficient of each lens of the optical imaging system in Embodiment 5. The radius of curvature and the thickness are shown in millimeters (mm).

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.5127 | 0.4500 | 1.62 | 23.5 | −1.2148 |
| S2 | aspheric | 1.4053 | 0.1343 | | | −9.1111 |
| STO | spherical | infinite | 0.0500 | | | |
| S3 | aspheric | 0.8636 | 0.3831 | 1.63 | 56.2 | −0.9797 |
| S4 | aspheric | 1.3113 | 0.2676 | | | 0.7516 |
| S5 | aspheric | 7.6532 | 0.5053 | 1.63 | 56.2 | 0.0000 |
| S6 | aspheric | 6.7930 | 0.0989 | | | 0.0000 |
| S7 | aspheric | 0.6587 | 0.3355 | 1.63 | 56.2 | −5.8942 |
| S8 | aspheric | 0.9567 | 0.2199 | | | −0.9448 |
| S9 | spherical | infinite | 0.2100 | 1.52 | 64.2 | |
| S10 | spherical | infinite | 0.5001 | | | |
| S11 | spherical | infinite | | | | |

As may be seen from Table 13, in Embodiment 5, the object-side surface and the image-side surface of any one of the first lens E1 to the fourth lens E4 are aspheric surfaces. Table 14 shows the high-order coefficients of the aspheric surfaces applicable in Embodiment 5. Here, the surface types of the aspheric surfaces may be defined by the formula (1) given in the above Embodiment 1.

TABLE 14

| surface number | A4 | A6 | A8 | A10 | A12 | A14 | A16 |
|---|---|---|---|---|---|---|---|
| S1 | −1.1668E−01 | 4.5228E−02 | 5.5758E−02 | −7.6550E−02 | −2.4028E−01 | 3.7025E−01 | −1.3345E−01 |
| S2 | −2.8025E−01 | 1.7904E−01 | −2.2183E−02 | −1.8951E−01 | 2.6351E−01 | −7.5937E−02 | −7.1529E−03 |
| S3 | −4.9314E−01 | 6.8086E−01 | −2.4991E+00 | 4.1926E+00 | −2.4766E+00 | −3.4909E−02 | 3.8125E−01 |
| S4 | 1.0537E−01 | −1.2783E+00 | 2.1608E+00 | −3.6801E+00 | 3.9820E+00 | −1.4917E+00 | −2.7452E−01 |
| S5 | 3.1898E−03 | 6.1501E−01 | −4.1961E+00 | 1.3016E+01 | −2.3924E+01 | 2.3076E+01 | −8.7561E+00 |
| S6 | −2.2236E+00 | 8.9436E+00 | −2.5021E+01 | 4.6071E+01 | −5.2725E+01 | 3.3637E+01 | −8.9497E+00 |
| S7 | −5.4604E−01 | 5.9225E−01 | −1.6306E+00 | 3.2250E+00 | −3.5114E+00 | 1.9690E+00 | −4.3644E−01 |
| S8 | −5.1164E−01 | −3.6135E−03 | 3.9806E−01 | −3.8530E−01 | 1.4877E−01 | −2.0983E−02 | 0.0000E+00 |

Table 15 gives the effective focal lengths f1-f4 of the lenses in Embodiment 5, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 15

| f1 (mm) | 53.79 | f (mm) | 2.08 |
|---|---|---|---|
| f2 (mm) | 3.72 | TTL (mm) | 3.15 |
| f3 (mm) | −144.17 | ImgH (mm) | 1.58 |
| f4 (mm) | 2.90 | | |

Figure 10A:
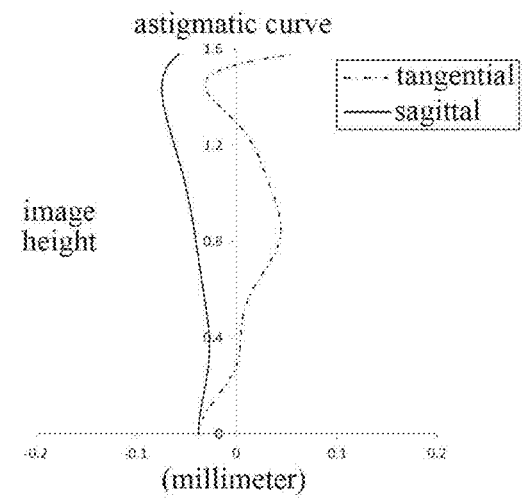
FIGS. 10A-10C respectively illustrate an astigmatic curve, a distortion curve and a relative illumination curve of the optical imaging system according to Embodiment 5.
Figure 10B:
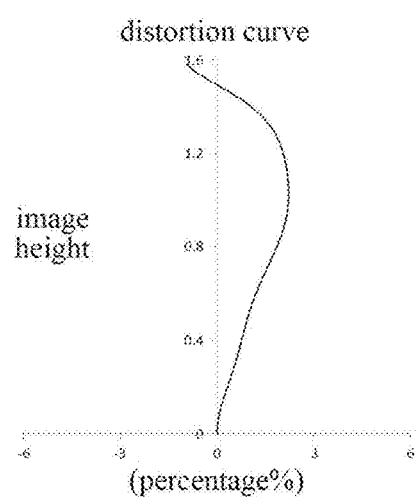
Figure 10C:
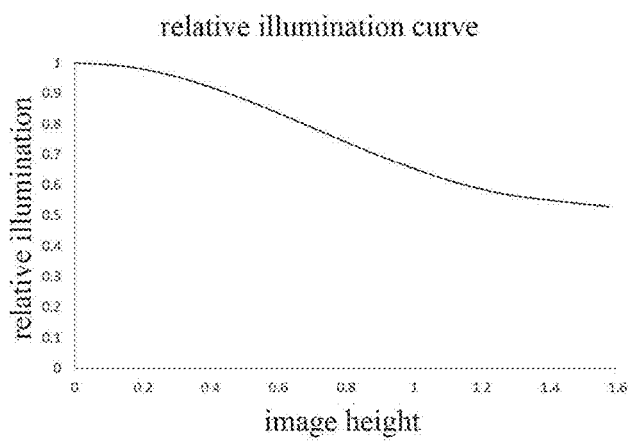

FIG. 10A illustrates the astigmatic curve of the optical imaging system according to Embodiment 5, representing a curvature of the tangential image plane and a curvature of the sagittal image plane. FIG. 10B illustrates the distortion curve of the optical imaging system according to Embodiment 5, representing amounts of distortion at different viewing angles. FIG. 10C illustrates the relative illumination curve of the optical imaging system according to Embodiment 5, representing relative illuminations of different image heights on the image plane. It can be seen from FIGS. 10A-10C that the optical imaging system according to Embodiment 5 can achieve a good imaging quality.

Embodiment 6

Figure 11:
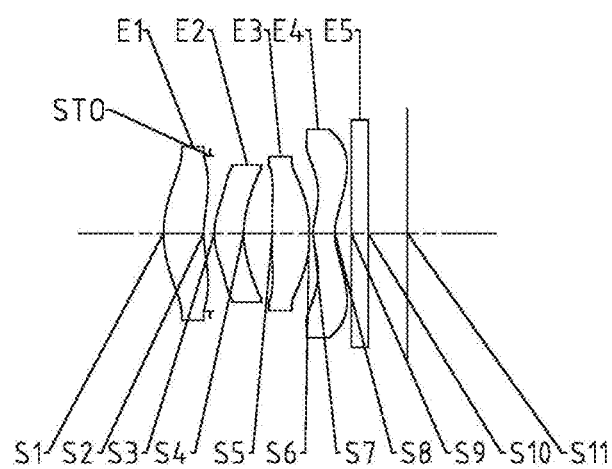
FIG. 11 is a schematic structural diagram illustrating an optical imaging system according to Embodiment 6 of the present disclosure.

An optical imaging system according to Embodiment 6 of the present disclosure is described below with reference to FIGS. 11-12C. FIG. 11 is a schematic structural diagram illustrating the optical imaging system according to Embodiment 6 of the present disclosure.

As shown in FIG. 11, the optical imaging system according to the exemplary implementations of the present disclosure includes, sequentially along the optical axis from the object side to the image side: a first lens E1, a diaphragm STO, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10, which may be an infrared bandpass filter and a passband of the optical filter E5 may be about 750 nm to about 1000 nm, and further, the passband may be about 850 nm to about 940 nm. Light from an object sequentially passes through the surfaces S1-S10 and finally forms an image on the image plane S11.

Table 16 shows the surface type, the radius of curvature, the thickness, the material and the conic coefficient of each lens of the optical imaging system in Embodiment 6. The radius of curvature and the thickness are shown in millimeters (mm).

TABLE 16

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.4178 | 0.5071 | 1.62 | 23.5 | −0.9162 |
| S2 | aspheric | 1.3560 | 0.0847 | | | −13.7388 |
| STO | spherical | infinite | 0.0501 | | | |
| S3 | aspheric | 0.8458 | 0.3716 | 1.63 | 56.2 | −0.9190 |
| S4 | aspheric | 1.2420 | 0.3626 | | | 1.0232 |
| S5 | aspheric | 10164.6858 | 0.4651 | 1.63 | 56.2 | −849312413.6 |
| S6 | aspheric | −10.1794 | 0.0514 | | | 0.0000 |
| S7 | aspheric | 0.6108 | 0.2745 | 1.63 | 56.2 | −12.4577 |
| S8 | aspheric | 0.7504 | 0.2092 | | | −1.3691 |
| S9 | spherical | infinite | 0.2100 | 1.52 | 64.2 | |
| S10 | spherical | infinite | 0.5000 | | | |
| S11 | spherical | infinite | | | | |

As may be seen from Table 16, in Embodiment 6, the object-side surface and the image-side surface of any one of the first lens E1 to the fourth lens E4 are aspheric surfaces. Table 17 shows the high-order coefficients of the aspheric surfaces applicable in Embodiment 6. Here, the surface types of the aspheric surfaces may be defined by the formula (1) given in the above Embodiment 1.

refractive power, an object-side surface S5 of the third lens E3 is a convex surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side

TABLE 17

| surface number | A4 | A6 | A8 | A10 | A12 | A14 | A16 |
|---|---|---|---|---|---|---|---|
| S1 | −1.0108E−01 | 3.9183E−02 | 2.2631E−02 | −9.8675E−02 | −2.3754E−01 | 3.8566E−01 | −1.3720E−01 |
| S2 | −3.3909E−01 | 1.7977E−01 | 7.0949E−03 | −1.8905E−01 | 2.2919E−01 | −7.4188E−02 | −7.4130E−03 |
| S3 | −6.3452E−01 | −1.9244E−01 | 1.1804E+00 | −1.6204E+00 | 3.1013E+00 | −3.5357E+00 | 1.5060E+00 |
| S4 | −3.0552E−01 | 1.6646E+00 | −1.4499E+01 | 4.9681E+01 | −8.8397E+01 | 8.1567E+01 | −3.1466E+01 |
| S5 | 3.8617E−01 | −2.0272E+00 | 3.3505E+00 | 4.8201E+00 | −2.9750E+01 | 4.5176E+01 | −2.3649E+01 |
| S6 | −2.4666E+00 | 1.1444E+01 | −3.1749E+01 | 5.3587E+01 | −5.3588E+01 | 2.9557E+01 | −6.9476E+00 |
| S7 | −8.0708E−01 | 6.4179E−01 | 4.1531E−01 | −1.4099E+00 | 1.2371E+00 | −4.2854E−01 | 4.2530E−02 |
| S8 | −1.2338E+00 | 1.8596E+00 | −1.9409E+00 | 1.2861E+00 | −4.9592E−01 | 8.2282E−02 | 0.0000E+00 |

Table 18 gives the effective focal lengths f1-f4 of the lenses in Embodiment 6, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 18

| f1 (mm) | 23.72 | f (mm) | 2.10 |
|---|---|---|---|
| f2 (mm) | 3.81 | TTL (mm) | 3.09 |
| f3 (mm) | 19.35 | ImgH (mm) | 1.58 |
| f4 (mm) | 3.72 | | |

Figure 12A:
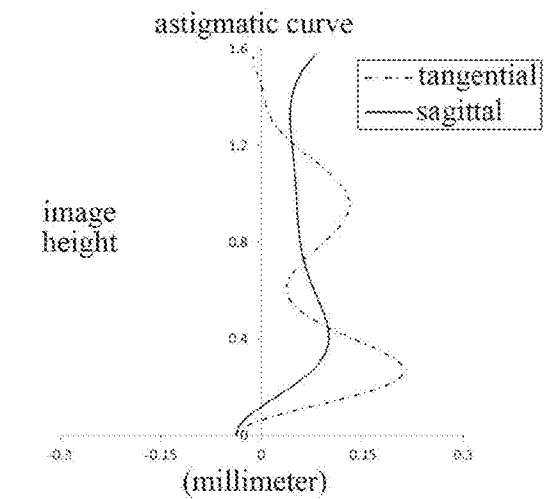
FIGS. 12A-12C respectively illustrate an astigmatic curve, a distortion curve and a relative illumination curve of the optical imaging system according to Embodiment 6.
Figure 12B:
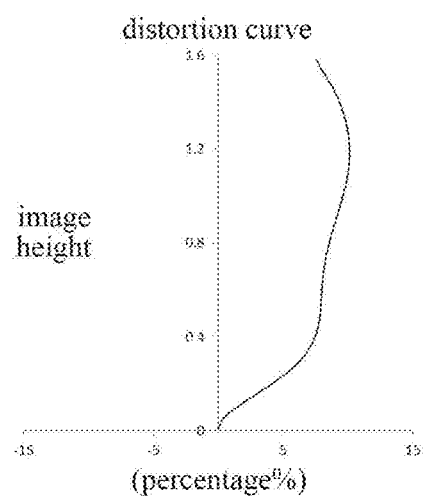
Figure 12C:
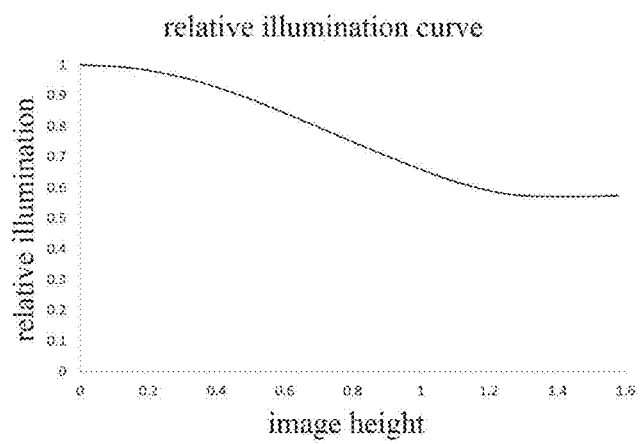

FIG. 12A illustrates the astigmatic curve of the optical imaging system according to Embodiment 6, representing a curvature of the tangential image plane and a curvature of the sagittal image plane. FIG. 12B illustrates the distortion curve of the optical imaging system according to Embodiment 6, representing amounts of distortion at different viewing angles. FIG. 12C illustrates the relative illumination curve of the optical imaging system according to Embodiment 6, representing relative illuminations of different image heights on the image plane. It can be seen from FIGS. 12A-12C that the optical imaging system according to Embodiment 6 can achieve a good imaging quality.

Embodiment 7

Figure 13:
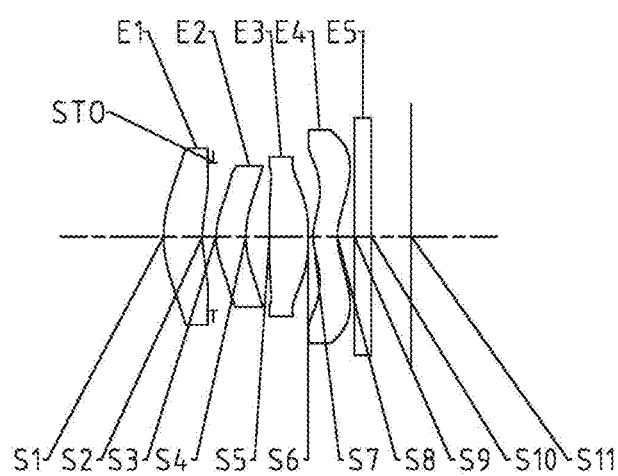
FIG. 13 is a schematic structural diagram illustrating an optical imaging system according to Embodiment 7 of the present disclosure.

An optical imaging system according to Embodiment 7 of the present disclosure is described below with reference to FIGS. 13-14C. FIG. 13 is a schematic structural diagram illustrating the optical imaging system according to Embodiment 7 of the present disclosure.

As shown in FIG. 13, the optical imaging system according to the exemplary implementations of the present disclosure includes, sequentially along the optical axis from the object side to the image side: a first lens E1, a diaphragm STO, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive surface S10, which may be an infrared bandpass filter and a passband of the optical filter E5 may be about 750 nm to about 1000 nm, and further, the passband may be about 850 nm to about 940 nm. Light from an object sequentially passes through the surfaces S1-S10 and finally forms an image on the image plane S11.

Table 19 shows the surface type, the radius of curvature, the thickness, the material and the conic coefficient of each lens of the optical imaging system in Embodiment 7. The radius of curvature and the thickness are shown in millimeters (mm).

TABLE 19

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.4505 | 0.4855 | 1.62 | 23.5 | −1.1380 |
| S2 | aspheric | 1.4040 | 0.1209 | | | −9.6328 |
| STO | spherical | infinite | 0.0500 | | | |
| S3 | aspheric | 0.8546 | 0.3711 | 1.63 | 56.2 | −0.9274 |
| S4 | aspheric | 1.2828 | 0.2933 | | | 0.9736 |
| S5 | aspheric | 28.2282 | 0.4843 | 1.63 | 56.2 | 17.7986 |
| S6 | aspheric | −22.3140 | 0.0622 | | | 0.0000 |
| S7 | aspheric | 0.6445 | 0.3026 | 1.63 | 56.2 | −4.9254 |
| S8 | aspheric | 0.7789 | 0.2140 | | | −1.2674 |
| S9 | spherical | infinite | 0.2100 | 1.52 | 64.2 | |
| S10 | spherical | infinite | 0.5000 | | | |
| S11 | spherical | infinite | | | | |

As may be seen from Table 19, in Embodiment 7, the object-side surface and the image-side surface of any one of the first lens E1 to the fourth lens E4 are aspheric surfaces. Table 20 shows the high-order coefficients of the aspheric surfaces applicable in Embodiment 7. Here, the surface types of the aspheric surfaces may be defined by the formula (1) given in the above Embodiment 1.

TABLE 20

| surface number | A4 | A6 | A8 | A10 | A12 | A14 | A16 |
|---|---|---|---|---|---|---|---|
| S1 | −1.1235E−01 | 5.5845E−02 | 3.7263E−02 | −9.0487E−02 | −2.3558E−01 | 3.8567E−01 | −1.3879E−01 |
| S2 | −3.1557E−01 | 1.8694E−01 | 3.0387E−04 | −1.9533E−01 | 2.3834E−01 | −4.8168E−02 | −7.7421E−03 |
| S3 | −5.4566E−01 | 5.5261E−01 | −2.9557E+00 | 7.0115E+00 | −6.8076E+00 | 2.7971E+00 | −2.7059E−01 |
| S4 | 4.1973E−02 | −8.5771E−01 | −1.3033E+00 | 7.2671E+00 | −1.2756E+01 | 1.1442E+01 | −4.6433E+00 |
| S5 | 1.7453E−01 | 2.6029E−01 | −5.0693E+00 | 2.0420E+01 | −4.1641E+01 | 4.3029E+01 | −1.7861E+01 |
| S6 | −2.1534E+00 | 8.2621E+00 | −1.8371E+01 | 2.4227E+01 | −1.8104E+01 | 7.1823E+00 | −1.2081E+00 |
| S7 | −1.4112E+00 | 3.3058E+00 | −5.7870E+00 | 6.7342E+00 | −4.8984E+00 | 2.0358E+00 | −3.6474E−01 |
| S8 | −1.1057E+00 | 1.5599E+00 | −1.6714E+00 | 1.1745E+00 | −4.7981E−01 | 8.2988E−02 | 0.0000E+00 |

Table 21 gives the effective focal lengths f1-f4 of the lenses in Embodiment 7, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 21

| f1 (mm) | 23.85 | f (mm) | 2.10 |
|---|---|---|---|
| f2 (mm) | 3.75 | TTL (mm) | 3.09 |
| f3 (mm) | 23.79 | ImgH (mm) | 1.58 |
| f4 (mm) | 4.00 | | |

Figure 14A:
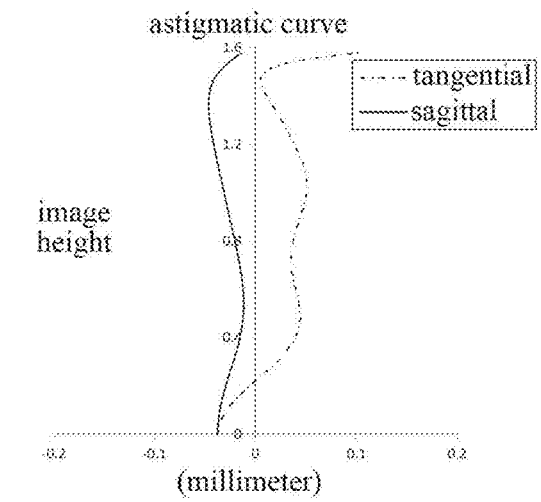
FIGS. 14A-14C respectively illustrate an astigmatic curve, a distortion curve and a relative illumination curve of the optical imaging system according to Embodiment 7.
Figure 14B:
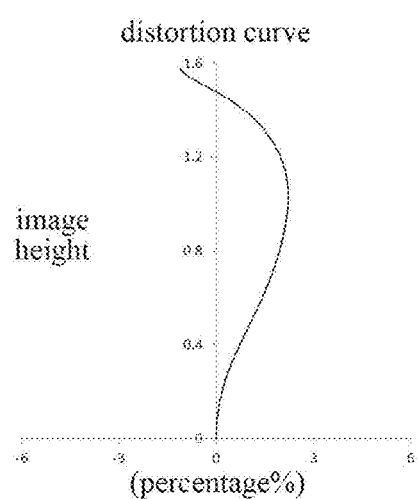
Figure 14C:
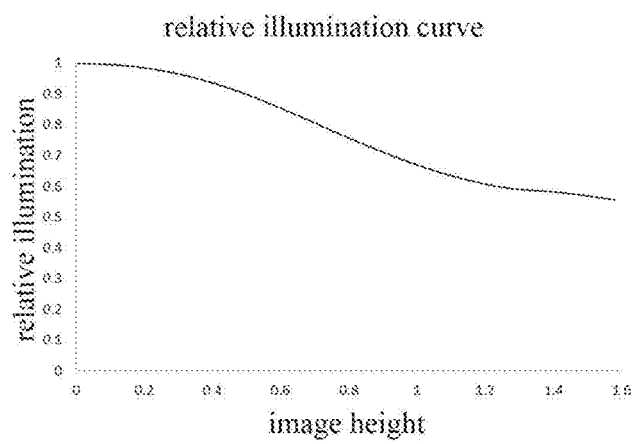

FIG. 14A illustrates the astigmatic curve of the optical imaging system according to Embodiment 7, representing a curvature of the tangential image plane and a curvature of the sagittal image plane. FIG. 14B illustrates the distortion curve of the optical imaging system according to Embodiment 7, representing amounts of distortion at different viewing angles. FIG. 14C illustrates the relative illumination curve of the optical imaging system according to Embodiment 7, representing relative illuminations of different image heights on the image plane. It can be seen from FIGS. 14A-14C that the optical imaging system according to Embodiment 7 can achieve a good imaging quality.

Embodiment 8

Figure 15:
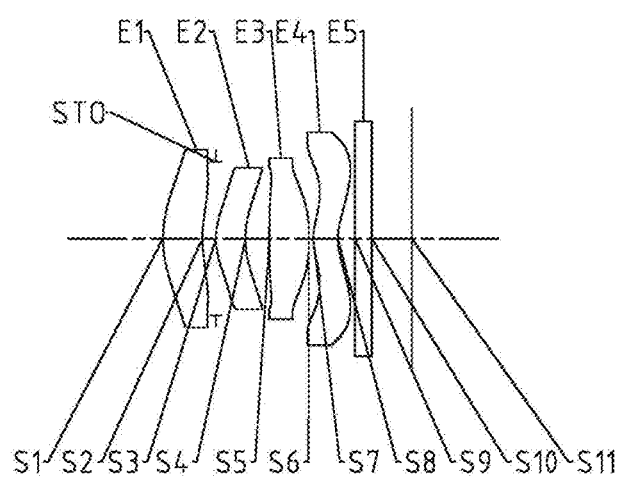
FIG. 15 is a schematic structural diagram illustrating an optical imaging system according to Embodiment 8 of the present disclosure.

An optical imaging system according to Embodiment 8 of the present disclosure is described below with reference to FIGS. 15-16C. FIG. 15 is a schematic structural diagram illustrating the optical imaging system according to Embodiment 8 of the present disclosure.

As shown in FIG. 15, the optical imaging system according to the exemplary implementations of the present disclosure includes, sequentially along the optical axis from the object side to the image side: a first lens E1, a diaphragm STO, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10, which may be an infrared bandpass filter and a passband of the optical filter E5 may be about 750 nm to about 1000 nm, and further, the passband may be about 850 nm to about 940 nm. Light from an object sequentially passes through the surfaces S1-S10 and finally forms an image on the image plane S11.

Table 22 shows the surface type, the radius of curvature, the thickness, the material and the conic coefficient of each lens of the optical imaging system in Embodiment 8. The radius of curvature and the thickness are shown in millimeters (mm).

TABLE 22

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.4579 | 0.4900 | 1.62 | 23.5 | −1.0897 |
| S2 | aspheric | 1.4307 | 0.1202 | | | −9.7726 |
| STO | spherical | infinite | 0.0500 | | | |
| S3 | aspheric | 0.8607 | 0.3693 | 1.63 | 56.2 | −0.9277 |
| S4 | aspheric | 1.2810 | 0.2966 | | | 0.9757 |
| S5 | aspheric | 36.2694 | 0.4946 | 1.63 | 56.2 | 400.5542 |
| S6 | aspheric | −13.3402 | 0.0544 | | | 0.0000 |
| S7 | aspheric | 0.6661 | 0.3068 | 1.63 | 56.2 | −5.2641 |
| S8 | aspheric | 0.7983 | 0.2131 | | | −1.1764 |
| S9 | spherical | infinite | 0.2100 | 1.52 | 64.2 | |
| S10 | spherical | infinite | 0.5000 | | | |
| S11 | spherical | infinite | | | | |

As may be seen from Table 22, in Embodiment 8, the object-side surface and the image-side surface of any one of the first lens E1 to the fourth lens E4 are aspheric surfaces. Table 23 shows the high-order coefficients of the aspheric surfaces applicable in Embodiment 8. Here, the surface types of the aspheric surfaces may be defined by the formula (1) given in the above Embodiment 1.

TABLE 23

| surface number | A4 | A6 | A8 | A10 | A12 | A14 | A16 |
|---|---|---|---|---|---|---|---|
| S1 | −1.1036E−01 | 5.6353E−02 | 3.7136E−02 | −9.0095E−02 | −2.3563E−01 | 3.8523E−01 | −1.3884E−01 |
| S2 | −3.1398E−01 | 1.8902E−01 | 9.4067E−04 | −1.9652E−01 | 2.3747E−01 | −4.9101E−02 | −7.3560E−03 |
| S3 | −5.4405E−01 | 5.5950E−01 | −3.0561E+00 | 7.4949E+00 | −7.7783E+00 | 3.6692E+00 | −5.6286E−01 |
| S4 | 6.3788E−02 | −1.1017E+00 | 4.1944E−03 | 3.6636E+00 | −7.2517E+00 | 6.9609E+00 | −3.1280E+00 |

TABLE 23-continued

| surface number | A4 | A6 | A8 | A10 | A12 | A14 | A16 |
|---|---|---|---|---|---|---|---|
| S5 | 2.3057E−01 | −1.8702E−01 | −2.8241E+00 | 1.3943E+01 | −3.0790E+01 | 3.3113E+01 | −1.4063E+01 |
| S6 | −2.1046E+00 | 8.0638E+00 | −1.7915E+01 | 2.4121E+01 | −1.9279E+01 | 8.7462E+00 | −1.7961E+00 |
| S7 | −1.4180E+00 | 3.4070E+00 | −5.9624E+00 | 6.8271E+00 | −4.9145E+00 | 2.0542E+00 | −3.7539E−01 |
| S8 | −1.1002E+00 | 1.5416E+00 | −1.6643E+00 | 1.1689E+00 | −4.7423E−01 | 8.1393E−02 | 0.0000E+00 |

Table 24 gives the effective focal lengths f1-f4 of the lenses in Embodiment 8, the total effective focal length f of the optical imaging system, the distance TTL on the optical axis from the center of the object-side surface S1 of the first lens E1 to the image plane S11, and the half of the diagonal length ImgH of the effective pixel area on the image plane S11.

TABLE 24

| f1 (mm) | 21.22 | f (mm) | 2.11 |
|---|---|---|---|
| f2 (mm) | 3.83 | TTL (mm) | 3.11 |
| f3 (mm) | 18.62 | ImgH (mm) | 1.58 |
| f4 (mm) | 4.25 | | |

Figure 16A:
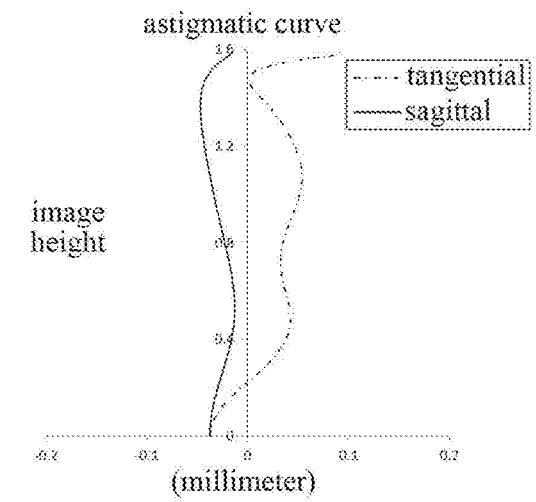
FIGS. 16A-16C respectively illustrate an astigmatic curve, a distortion curve and a relative illumination curve of the optical imaging system according to Embodiment 8.
Figure 16B:
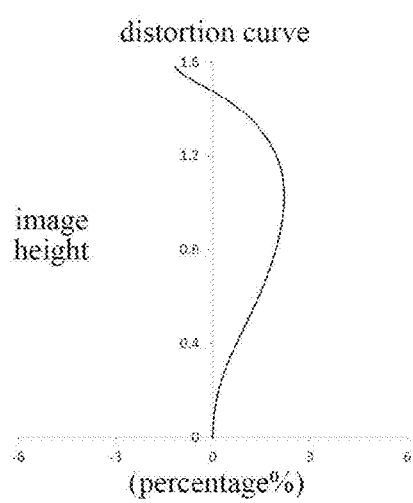
Figure 16C:
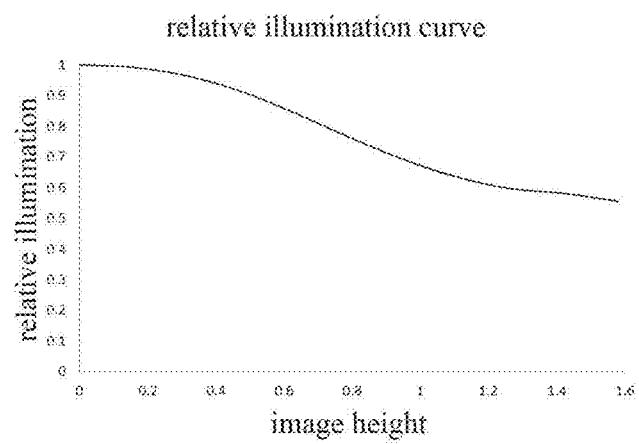

FIG. 16A illustrates the astigmatic curve of the optical imaging system according to Embodiment 8, representing a curvature of the tangential image plane and a curvature of the sagittal image plane. FIG. 16B illustrates the distortion curve of the optical imaging system according to Embodiment 8, representing amounts of distortion at different viewing angles. FIG. 16C illustrates the relative illumination curve of the optical imaging system according to Embodiment 8, representing relative illuminations of different image heights on the image plane. It can be seen from FIGS. 16A-16C that the optical imaging system according to Embodiment 8 can achieve a good imaging quality.

Embodiment 9

Figure 17:
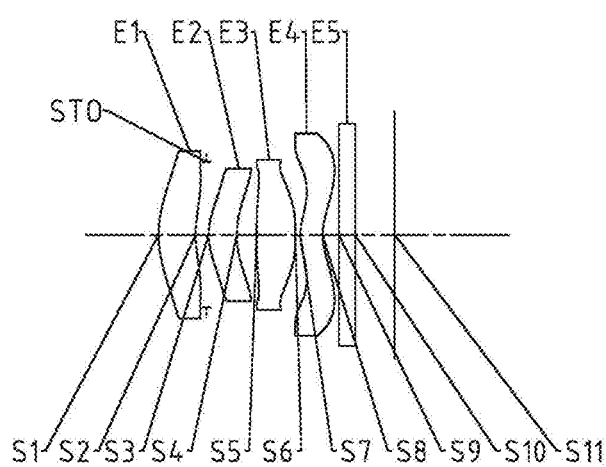
FIG. 17 is a schematic structural diagram illustrating an optical imaging system according to Embodiment 9 of the present disclosure.

An optical imaging system according to Embodiment 9 of the present disclosure is described below with reference to FIGS. 17-18C. FIG. 17 is a schematic structural diagram illustrating the optical imaging system according to Embodiment 9 of the present disclosure.

As shown in FIG. 17, the optical imaging system according to the exemplary implementations of the present disclosure includes, sequentially along the optical axis from the object side to the image side: a first lens E1, a diaphragm STO, a second lens E2, a third lens E3, a fourth lens E4, an optical filter E5 and an image plane S11.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10, which may be an infrared bandpass filter and a passband of the optical filter E5 may be about 750 nm to about 1000 nm, and further, the passband may be about 850 nm to about 940 nm. Light from an object sequentially passes through the surfaces S1-S10 and finally forms an image on the image plane S11.

Table 25 shows the surface type, the radius of curvature, the thickness, the material and the conic coefficient of each lens of the optical imaging system in Embodiment 9. The radius of curvature and the thickness are shown in millimeters (mm).

TABLE 25

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.4581 | 0.4692 | 1.62 | 23.5 | −1.1592 |
| S2 | aspheric | 1.4464 | 0.1181 | | | −10.6350 |
| STO | spherical | infinite | 0.0500 | | | |
| S3 | aspheric | 0.8555 | 0.3563 | 1.63 | 56.2 | −0.9042 |
| S4 | aspheric | 1.2593 | 0.2529 | | | 0.8588 |
| S5 | aspheric | 13.9881 | 0.4903 | 1.63 | 56.2 | 242.5214 |
| S6 | aspheric | −28.5433 | 0.0634 | | | 0.0000 |
| S7 | aspheric | 0.6207 | 0.2841 | 1.63 | 56.2 | −4.9135 |
| S8 | aspheric | 0.7637 | 0.2058 | | | −1.4093 |
| S9 | spherical | infinite | 0.2100 | 1.52 | 64.2 | |
| S10 | spherical | infinite | 0.5000 | | | |
| S11 | spherical | infinite | | | | |

As may be seen from Table 25, in Embodiment 9, the object-side surface and the image-side surface of any one of the first lens E1 to the fourth lens E4 are aspheric surfaces. Table 26 shows the high-order coefficients of the aspheric surfaces applicable in Embodiment 9. Here, the surface types of the aspheric surfaces may be defined by the formula (1) given in the above Embodiment 1.

TABLE 26

| surface number | A4 | A6 | A8 | A10 | A12 | A14 | A16 |
|---|---|---|---|---|---|---|---|
| S1 | −1.1422E−01 | 4.2885E−02 | 2.8348E−02 | −8.2165E−02 | −2.2074E−01 | 3.9272E−01 | −1.4896E−01 |
| S2 | −3.2129E−01 | 1.9066E−01 | 6.9457E−03 | −1.8668E−01 | 2.4785E−01 | −4.5567E−02 | −4.8500E−03 |
| S3 | −5.6899E−01 | 6.3403E−01 | −3.6232E+00 | 9.1368E+00 | −9.6318E+00 | 4.3977E+00 | −5.5173E−01 |
| S4 | 1.1223E−01 | −1.5787E+00 | 2.1847E+00 | −3.0223E+00 | 4.5828E+00 | −3.7925E+00 | 6.1124E−01 |
| S5 | 8.8954E−02 | 1.1247E+00 | −1.0410E+01 | 3.9107E+01 | −7.9401E+01 | 8.3508E+01 | −3.5705E+01 |
| S6 | −2.4331E+00 | 9.7953E+00 | −2.3135E+01 | 3.3065E+01 | −2.7976E+01 | 1.3593E+01 | −3.0605E+00 |
| S7 | −1.5474E+00 | 3.7249E+00 | −6.6950E+00 | 7.8941E+00 | −5.7766E+00 | 2.4429E+00 | −4.5437E−01 |
| S8 | −1.1641E+00 | 1.7566E+00 | −1.9709E+00 | 1.4369E+00 | −6.0408E−01 | 1.0719E−01 | 0.0000E+00 |

Table 27 gives the effective focal lengths f1-f4 of the lenses in Embodiment 9, the total effective focal length f of the optical imaging system, the distance TTL on the optical axis from the center of the object-side surface S1 of the first lens E1 to the image plane S11, and the half of the diagonal length ImgH of the effective pixel area on the image plane S11.

TABLE 27

| f1 (mm) | 20.48 | f (mm) | 2.01 |
|---|---|---|---|
| f2 (mm) | 3.89 | TTL (mm) | 3.00 |
| f3 (mm) | 17.93 | ImgH (mm) | 1.58 |
| f4 (mm) | 3.75 | | |

Figure 18A:
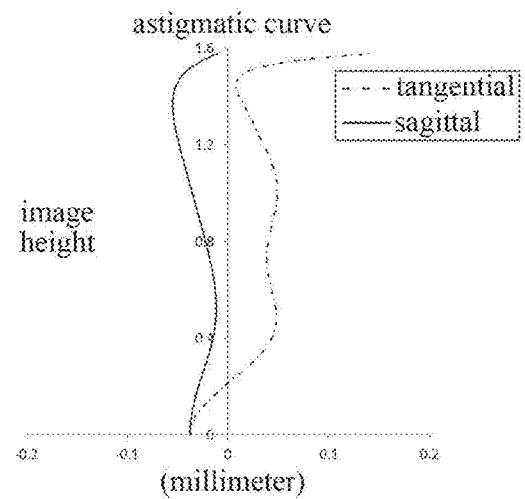
FIGS. 18A-18C respectively illustrate an astigmatic curve, a distortion curve and a relative illumination curve of the optical imaging system according to Embodiment 9.
Figure 18B:
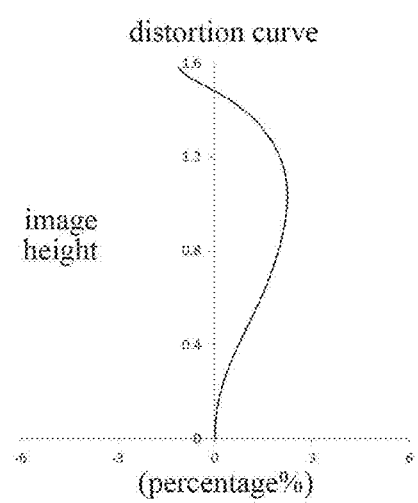
Figure 18C:
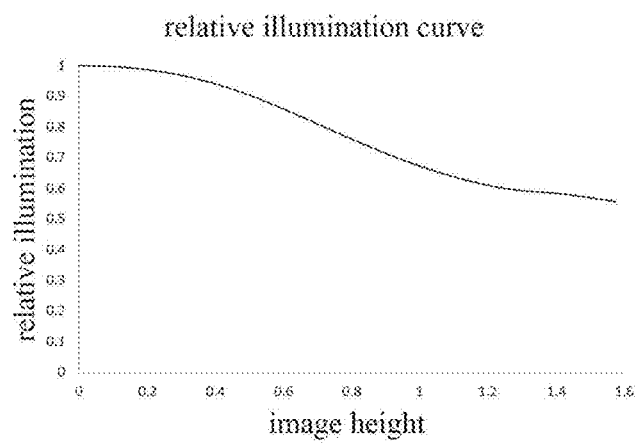

FIG. 18A illustrates the astigmatic curve of the optical imaging system according to Embodiment 9, representing a curvature of the tangential image plane and a curvature of the sagittal image plane. FIG. 18B illustrates the distortion curve of the optical imaging system according to Embodiment 9, representing amounts of distortion at different viewing angles. FIG. 18C illustrates the relative illumination curve of the optical imaging system according to Embodiment 9, representing relative illuminations of different image heights on the image plane. It can be seen from FIGS. 18A-18C that the optical imaging system according to Embodiment 9 can achieve a good imaging quality.

To sum up, Embodiments 1-9 respectively satisfy the relationships shown in Table 28.

TABLE 28

| conditional expression | embodiment | | | | | | | | |
|---|---|---|---|---|---|---|---|---|---|
| | 1 | 2 | 3 | 4 | 5 | 6 | 7 | 8 | 9 |
| (DT11 + DT21 + DT32 + DT42)/EPD | 2.32 | 2.36 | 2.31 | 2.25 | 2.33 | 2.28 | 2.31 | 2.30 | 2.33 |
| f/EPD | 1.12 | 1.12 | 1.08 | 1.33 | 1.12 | 1.12 | 1.12 | 1.12 | 1.12 |
| f4/f | 1.64 | 2.11 | 1.45 | 7.23 | 1.39 | 1.78 | 1.90 | 2.02 | 1.87 |
| f/CT4 | 7.51 | 7.70 | 7.60 | 9.37 | 6.21 | 7.64 | 6.95 | 6.87 | 7.07 |
| (R3 + R4)/(R3 − R4) | −6.04 | −4.31 | −4.85 | −5.26 | −4.86 | −5.27 | −4.99 | −5.10 | −5.24 |
| |f/f1| + |f/f2| | 0.66 | 0.74 | 0.60 | 0.77 | 0.60 | 0.64 | 0.65 | 0.65 | 0.61 |
| f2/R4 | 3.61 | 2.45 | 2.81 | 3.00 | 2.83 | 3.07 | 2.92 | 2.99 | 3.09 |
| CT1/T23 | 1.78 | 1.69 | 1.48 | 1.26 | 1.68 | 1.40 | 1.66 | 1.65 | 1.86 |
| (R4 + R8)/(R4 − R8) | 4.74 | 4.92 | 5.34 | 4.89 | 6.40 | 4.05 | 4.09 | 4.31 | 4.08 |

The present disclosure further provides an imaging device, having a photosensitive element that may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the optical imaging system described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An optical imaging system comprising, sequentially along an optical axis from an object side to an image side: a first lens, a second lens, a third lens, and a fourth lens,
   wherein the first lens, the third lens, and the fourth lens each has a positive refractive power or a negative refractive power;
   the second lens has a positive refractive power, and an image-side surface of the second lens is a concave surface;
   an image-side surface of the fourth lens is a concave surface; and
   an effective half-diameter DT11 of an object-side surface of the first lens, an effective half-diameter DT21 of an object-side surface of the second lens, an effective half-diameter DT32 of an image-side surface of the third lens, an effective half-diameter DT42 of the image-side surface of the fourth lens and an entrance pupil diameter EPD of the optical imaging system satisfy: $(DT11+DT21+DT32+DT42)/EPD \leq 2.4$.

2. The optical imaging system according to claim 1, wherein the optical imaging system further comprises an infrared bandpass filter disposed between the fourth lens and an image plane of the optical imaging system, and a passband of the infrared bandpass filter is 750 nm to 1000 nm.

3. The optical imaging system according to claim 2, wherein the passband of the infrared bandpass filter is 850 nm to 940 nm.

4. The optical imaging system according to claim 1, wherein a total effective focal length f of the optical imaging system and the entrance pupil diameter EPD of the optical imaging system satisfy: $f/EPD \leq 1.4$.

5. The optical imaging system according to claim 1, wherein the total effective focal length f of the optical imaging system and a center thickness CT4 of the fourth lens on the optical axis satisfy: $6 \leq f/CT4 \leq 10$.

6. The optical imaging system according to claim 1, wherein a radius of curvature R3 of the object-side surface of the second lens and a radius of curvature R4 of the image-side surface of the second lens satisfy: $-7 \leq (R3+R4)/(R3-R4) \leq -4$.

7. The optical imaging system according to claim 1, wherein the total effective focal length f of the optical imaging system, an effective focal length f1 of the first lens, and an effective focal length f2 of the second lens satisfy: $0.5 \leq |f/f1|+|f/f2| \leq 1$.

8. The optical imaging system according to claim 1, wherein an effective focal length f2 of the second lens and a radius of curvature R4 of the image-side surface of the second lens satisfy: $2 \leq f2/R4 \leq 4$.

9. The optical imaging system according to claim 1, wherein a center thickness CT1 of the first lens on the optical axis and a spacing distance T23 on the optical axis between the second lens and the third lens satisfy: $1 \leq CT1/T23 \leq 2$.

10. The optical imaging system according to claim 1, wherein a radius of curvature R4 of the image-side surface of the second lens and a radius of curvature R8 of the image-side surface of the fourth lens satisfy: $4 \leq (R4+R8)/(R4-R8) \leq 7$.

* * * * *